United States Patent
Bosman et al.

[19]

[11] Patent Number: 5,987,920
[45] Date of Patent: Nov. 23, 1999

[54] METHOD OF PRODUCING A PATTERNED SURFACIAL MARKING ON A TRANSPARENT BODY

[75] Inventors: Johan Bosman; Raymond J. L. Van Kooyk, both of Eindhoven, Netherlands

[73] Assignee: U.S. Philips Corporation, New York, N.Y.

[21] Appl. No.: 08/932,409

[22] Filed: Sep. 17, 1997

[30] Foreign Application Priority Data

Sep. 19, 1996 [EP] European Pat. Off. .............. 96202618

[51] Int. Cl.⁶ .................................................. C03C 19/00
[52] U.S. Cl. ................................ 65/23; 65/61; 219/121.6; 264/400; 264/482; 451/41
[58] Field of Search ................... 65/23, 61, 33.2, 65/103, 441; 219/121.6; 264/400, 482; 451/41

[56] References Cited

U.S. PATENT DOCUMENTS

| | | | |
|---|---|---|---|
| 3,790,744 | 2/1974 | Bowen | 219/121.6 |
| 4,654,290 | 3/1987 | Spanjer | 430/138 |
| 4,743,463 | 5/1988 | Ronn et al. | 427/597 |
| 4,843,207 | 6/1989 | Urbanek et al. | 219/212.6 |
| 5,173,441 | 12/1992 | Yu et al. | 438/676 |

FOREIGN PATENT DOCUMENTS

| | | |
|---|---|---|
| 0531584 | 3/1993 | European Pat. Off. . |
| 95/25639 | 9/1995 | WIPO . |

*Primary Examiner*—Sean Vincent
*Attorney, Agent, or Firm*—F. Brice Faller

[57] ABSTRACT

A method of producing a surfacial marking (11) on a surface (1b) of a body (1) of transmissive material, whereby use is made of a laser beam (5) having a wavelength λ to which the material is substantially transparent, which method comprises the following steps:

(a) providing a layer (3) of assistant material against the surface (1b), which assistant material is absorptive at the wavelength λ;

(b) directing the laser beam (5) through the body (1) onto the layer (3), so as to locally heat and ablate the layer (3).

8 Claims, 1 Drawing Sheet

METHOD OF PRODUCING A PATTERNED SURFACIAL MARKING ON A TRANSPARENT BODY

BACKGROUND OF THE INVENTION

The invention relates to a method of producing a surfacial marking on a surface of a body of transmissive material, whereby use is made of a laser beam having a wavelength λ to which the material is substantially transparent.

Such a method is known from European Patent Application EP 531 584. In the method therein described, a layer of an assistant material is directly deposited on the surface. This material comprises at least two different species of transition metal ion, which differ in valency and/or atomic number (e.g. $Ti^{3+}$ and $Ti^{4+}$, or $Ti^{3+}$ and $Fe^{3+}$). When subsequently irradiated with a laser beam having a wavelength in the range 300–1600 nm, a heated plasma is generated in the assistant material, and this plasma interacts with and locally etches the surface of the transmissive material. After etching has been completed, the layer of assistant material is removed from the surface.

SUMMARY OF THE INVENTION

It is an object of the invention to provide a new alternative to the known method.

This object is achieved according to the invention in a method as specified in the opening paragraph, characterized in that it comprises the following steps:
(a) providing a layer of assistant material against the surface, which assistant material is absorptive at the wavelength λ;
(b) directing the laser beam through the body onto the layer, so as to locally heat and ablate the layer.

The inventors have observed that, when the assistant layer in the inventive method is ablated in this manner, it (locally) expands against the adjacent surface of the transmissive body, thereby subjecting it to a force which causes local mechanical roughening of the surface, without significant occurrence of cracking or other breaching. Such roughening amounts to a readily visible and durable marking (e.g. a matt pattern on a shiny surface). It should be explicitly noted that it is not necessary for the assistant material to ablate to its full depth upon irradiation: in principle, only a surface portion of the assistant layer need ablate.

There are significant differences between the method according to the invention and the prior-art method. For example:
  The inventive method is ablative, and does not involve significant melting of the assistant material. In contrast, the known method relies on the generation of a high-temperature plasma in its assistant material;
  The marking mechanism in the inventive method is mechanical, whereas that in the known method is (chemo)physical;
  In the inventive method, the assistant material does not have to be directly applied to the surface of the transmissive body, but can instead be provided on a separate plate which is then pressed against the said surface. In the known method, however, the assistant material is directly deposited on the surface;
  As elucidated hereunder, the assistant material in the inventive method is relatively straightforward (e.g. an oxide or nitride of a single element), as opposed to the assistant material of the known method, which must comprise two distinct species of transition-metal ions.

Examples of transmissive materials which can be used in the inventive method include silicates such as glass and quartz, and plastics such as polymethyl methacrylate (PMMA), polycarbonate (PC) and polyethene terephthalate (PET). All of these materials are substantially transparent to visible light and infra-red wavelengths. It should be explicitly noted that the invention does not require the transmissive body to have any particular form (e.g. a planar geometry), as long as the (portion of the) surface to be marked can be brought into intimate contact with the layer of assistant material, whether by adhesion of the latter to the former or by mere juxtaposition of the two. The surface to be marked may therefore, for example, have a tubular, conical or spherical geometry, so that the inventive method can be used to mark the surfaces of such objects as bottles, light bulbs, display tubes, etc., as well as flat objects such as glass sheets.

Suitable lasers for use in the inventive method, and particularly in conjunction with the materials listed in the previous paragraph, include, for example, Nd:YAG lasers [λ≈1064 nm], frequency-doubled Nd:YAG lasers [λ≈532 nm], copper vapour lasers [λ≈511 and 578 nm] and (frequency-doubled) diode-pumped solid state lasers [e.g. λ≈532 nm]. Such lasers may be either continuous or pulsed (e.g. Q-switched). A particularly suitable choice is Nd:YAG, since such lasers are relatively cheap, have a short pulse-time (resulting in a relatively high radiative intensity), and can be used in conjunction with ordinary glass lenses and fiber optics.

The chosen power of the employed laser beam will depend inter alia on the value of λ, the choice of assistant material, the width of the employed laser beam, and whether or not the laser is pulsed. As a general rule of thumb, the inventors have observed that laser fluences of the order of about $2 \times 10^9$ $J/cm^2$ (per pulse), and higher, produce satisfactory results in the inventive method.

If so desired, the layer of assistant material may be applied directly to the surface to be marked, e.g. by brushing, spraying or spin-coating a suspension or solution of the material onto the surface, or by employing a physical or chemical vapour deposition technique. However, the inventive method also allows the layer of assistant material to be provided on a separate body (e.g. a metal or plastic plate, or a flexible foil), as long as the assistant material on that body can then be placed intimately against the surface to be marked (e.g. by clamping). An advantage of the latter approach is that unused (i.e. non-irradiated) portions of the assistant material do not subsequently have to be removed from the surface of the transmissive body (e.g. using a solvent). In the case of the former approach, a solid body (such as a metal plate, for example) should be pressed against the assistant layer at the side remote from the transmissive body, so as to ensure that the ablating assistant layer exerts sufficient force on the transmissive body.

A preferential embodiment of the method according to the invention is characterized in that the assistant material comprises a ceramic material. Ceramic materials generally have a relatively high melting point (of the order of 1000° C.), so that they can be subjected to a relatively high laser fluence without melting. In addition, they tend to be relatively brittle, so that, upon sudden heating, they can develop significant internal stress, which tends to cause rapid disintegration. As a result of these two facts, an assistant material which at least partially comprises a ceramic constituent will, when irradiated with a laser beam, be more inclined to eject debris than to vaporize, thereby lending itself to use in the inventive method.

Suitable examples of ceramic materials as elucidated in the previous paragraph include various oxides, such as aluminium oxide, titanium oxide and zirconium oxide, and other compounds, such as titanium nitride and tungsten carbide, as well as mixtures of two or more of these materials.

In a specific embodiment of the method according to the invention, the assistant material comprises a dye which is absorptive at the wavelength $\lambda$. The term "dye" is here intended to include pigments. Such a dye may be necessary if the rest of the assistant material does not have a sufficient coefficient of absorption at the wavelength $\lambda$. However, the amount of such dye should also not be excessive, since over-absorption of laser light will result in an increased tendency towards melting (vaporization) instead of ablation of the assistant material. Examples of dyes suitable for use in the invention include carbon blacks, various coloured oxides (such as iron oxide or copper oxide), and various phthalocyanides. The employed dye may be dispersed within the assistant material, or merely provided upon that surface thereof which is to be irradiated.

The assistant material may also comprise various other constituents, as desired or required by a particular application. Examples of such possible constituents include binders, plasticizers, solvents, adhesion-promoters, etc.

It should be noted that, if so desired, one or more thin films of transparent material may be provided between the layer of assistant material and the surface of the transmissive body to be marked. The purpose of such films may, for example, be to hinder corrosion of the assistant material. Such films should not be too thick, so as not to cushion the forces exerted on the transmissive body by the ablating assistant layer; in general, films having a thickness of the order of about 1 $\mu$m, or less, satisfy this condition.

In general, it will be desirable to use the inventive method to create a patterned marking on a given surface. This can, for example, be achieved by scanning the laser beam over the layer of assistant material according to the desired pattern. Alternatively, using a mask (stencil) and a (refractively) broadened laser beam, it is possible to directly project a pattern in one go onto the layer of assistant material. The latter approach will lead to a decrease in the laser power per unit area delivered to the assistant material, but, if necessary, this decrease can be compensated by using a more powerful laser to begin with. Examples of patterns which may be created using the inventive method include bar codes, letters, numerals, emblems, etc., as well as simple score lines and dots.

EMBODIMENT 1

Figure 1:
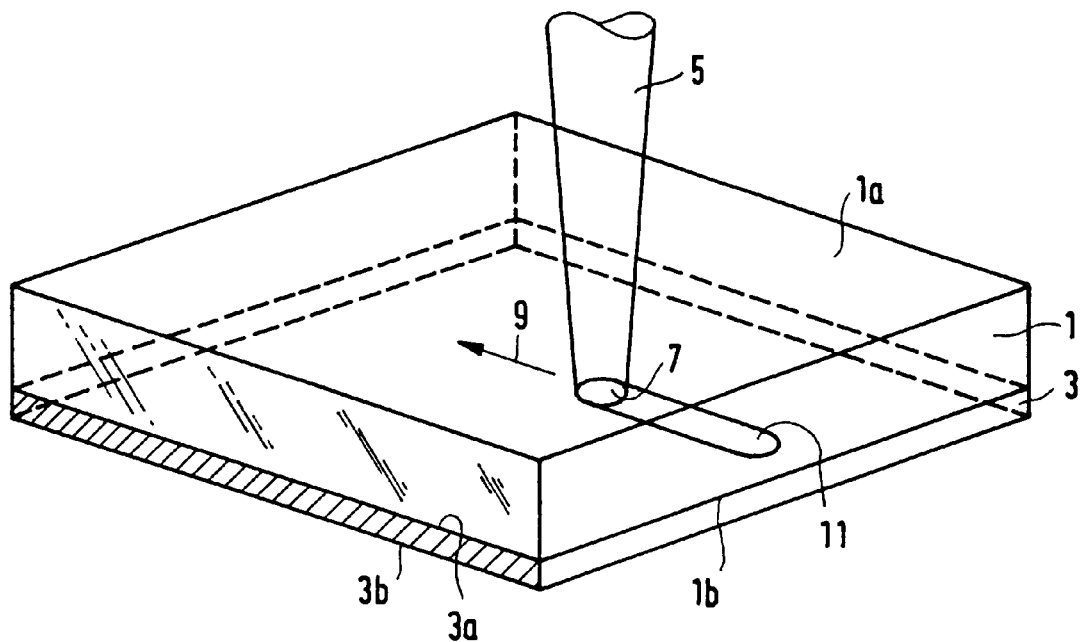
FIG. 1 renders a perspective view of the enaction of a particular embodiment of the method according to the invention.
Figure 2:
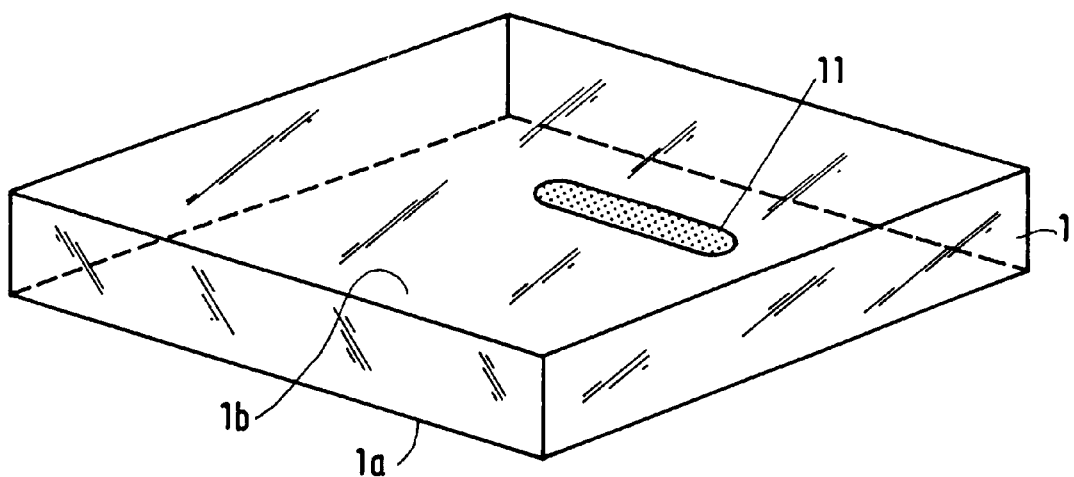
FIG. 2 shows the result of the procedure depicted in FIG. 1.

FIGS. 1 and 2 depict various aspects of the method according to the invention. Corresponding features in the two Figures are denoted by the same reference numerals.

FIG. 1 renders a perspective view of a particular enaction of the method according to the invention. The Figure shows a body 1 of transmissive material, which in this case is a flat soda-lime glass plate with a thickness of 5 mm. The body 1 has opposed major surfaces 1a and 1b. A plate 3 having opposed major surfaces 3a and 3b has been provided in contact with the surface 1b of the body 1. The body 1 is simply placed upon and pressed against the plate 3, so that the surfaces 1b and 3a are in intimate mutual contact.

In this particular case, the plate 3 is comprised of Al, and at least its surface 3a has been anodized, blackened, and coated with a thin sealing layer of aluminium hydroxide. In this manner, a surficial region of the plate 3 terminating at the surface 3a has been converted into a layer of assistant material ($Al_2O_3$) overlaid by a thin, transparent anti-corrosion film ($Al(OH)_3$). The thickness of the layer of assistant material is of the order of 20 $\mu$m, whereas that of the anti-corrosion film is about 0.75 $\mu$m.

The anodization procedure in the previous paragraph can, for example, be carried out by first roughening the surface 3a and then eloxating it. A dye can then be applied by immersing the plate 3 in a solution of carbon black, and sealing can subsequently be performed by immersing the plate in a solution of boiling water and soap. See, for example, *Praktische Oberflächentechnik by K. P. Müller, Vieweg Verlag, ISBN* 3-528-06562-1, Chapters 20.2 and 20.3 (pp 429–438).

It is the purpose of the inventive method in this case to provide a linear surficial marking on the surface 1b of the body 1. To this end, a laser beam 5 is directed through the body 1 onto the surface 3a. In this particular case, the laser beam 5 is derived from a Q-switched Nd:YAG laser (not depicted) with a wavelength $\lambda$ of 1064 nm, a radiative power of 3 W, a pulse frequency of 1000 Hz and a pulse time of 120 ns. The beam 5 is focused into a round spot 7 at the interface between the surfaces 1b and 3a, the diameter of this spot 7 being about 100 $\mu$m. As a result, the radiative fluence delivered to the surface 3a by the beam 5 is about $3.8 \times 10^9$ $J/cm^2$ per pulse.

Irradiation of the surface 3a in this manner causes rapid heating of the assistant material within the spot 7, leading to localized ablation of the layer 3 to a depth of the order of 5–15 $\mu$m. The debris thus ejected from the surface 3a exerts a mechanical force on the adjacent surface 1b of the body 1, resulting in localized roughening of the surface 1b.

By scanning the laser beam 5 in the direction of the arrow 9, the spot 7 traces out an elongated marking 11, which in this case is linear.

FIG. 2 depicts the body 1 of FIG. 1 after enaction of the inventive method thereupon. The body 1 has now been inverted, so that the marking 11 in the surface 1b is visible on the upper side of the body 1. The marking 11 is in fact a roughened elongated portion of the surface 1b, with a depth of the order of 15 $\mu$m.

EMBODIMENT 2

In a scenario otherwise identical to that in Embodiment 1, item 3 is now a layer of $Al_2O_3$, and is directly deposited on the surface 1b of the body 1 using (conventional) Chemical Vapour Deposition (CVD). This can, for example, be achieved using aluminium triacetylacetonate or aluminium isopropoxide as a precursor, butanol as a solvent and air as a carrier gas, and employing a reaction temperature (substrate temperature) of the order of 420–540° C. Color can be incorporated in the layer 3 by adding, for example, $Ni(NO_3)_2 6H_2O$ to the precursor, resulting in a grey hue in the layer 3 (due to the presence of $NiO_x$). During enaction of the inventive method, the surface 3b of the layer 3 is pressed against a smooth, solid surface (e.g. by clamping the assembly 1,3 to a metal plate).

After enaction of the inventive method, surplus $Al_2O_3$ can be removed from the surface 1b by dipping it in aqueous KOH or NaOH, for example.

We claim:

1. A method of producing a marking on a surface of a body of transmissive material, wherein use is made of a laser beam having a wavelength $\lambda$ to which the material is substantially transparent, wherein the method comprises the following steps;
(a) providing a layer of assistant material against the surface, which assistant material is absorptive at the wavelength $\lambda$ and ablated to eject debris when heated;
(b) directing the laser beam through the body onto the layer, so as to locally heat and ablate the layer, thereby causing ejection of debris and mechanical roughening of an adjacent portion of the surface of the body of transmissive material.

2. A method according to claim 1, characterized in that the transmissive material is vitreous.

3. A method according to claim 1, characterized in that the laser beam is obtained from a Nd:YAG laser.

4. A method according to claim 1, characterized in that the assistant material comprises a ceramic material.

5. A method according to claim 4, characterized in that the ceramic material is oxidic.

6. A method according to claim 5, characterized in that the ceramic material is selected from the group consisting of aluminium oxide, titanium oxide, zirconium oxide, and their mixtures.

7. A method according to claim 4, characterized in that the ceramic material is selected from the group consisting of titanium nitride, tungsten carbide, and their mixtures.

8. A method according to claim 1, characterized in that the assistant material comprises a dye which is absorptive at the wavelength $\lambda$.

* * * * *